W. T. COULSON.
CONSTRUCTION OF LENSES FOR LAMPS, PROJECTORS, AND THE LIKE.
APPLICATION FILED FEB. 10, 1919.
1,350,957. Patented Aug. 24, 1920.
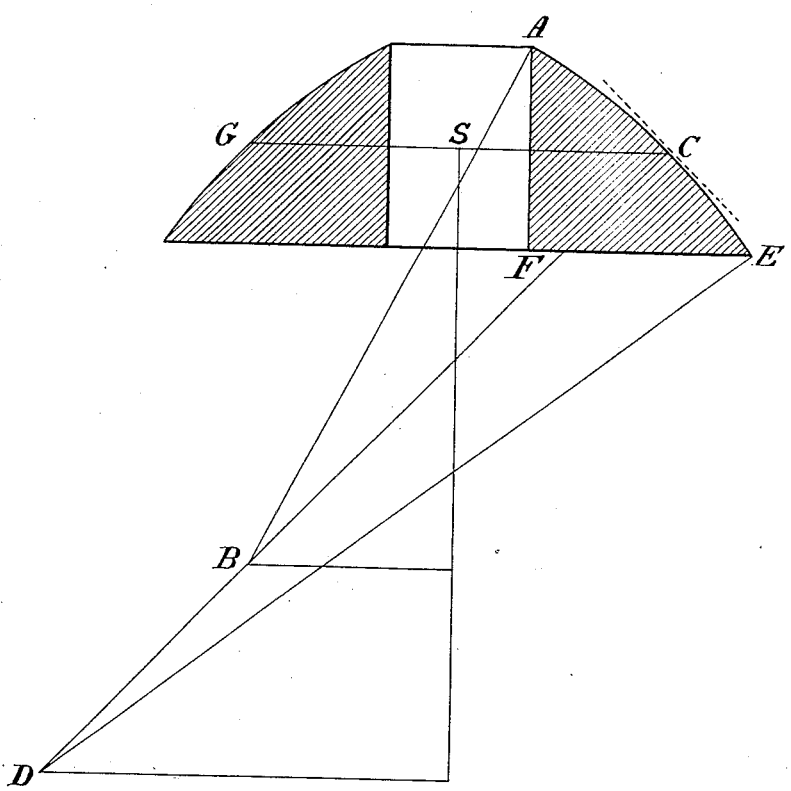

UNITED STATES PATENT OFFICE.

WILLIAM THOMAS COULSON, OF ANERLEY, LONDON, ENGLAND.

CONSTRUCTION OF LENSES FOR LAMPS, PROJECTORS, AND THE LIKE.

1,350,957.  Specification of Letters Patent.  Patented Aug. 24, 1920.

Application filed February 10, 1919. Serial No. 276,113.

*To all whom it may concern:*

Be it known that I, WILLIAM THOMAS COULSON, a subject of the King of Great Britain, residing at Anerley, London, England, have invented certain new and useful Improvements in Construction of Lenses for Lamps, Projectors, and the like, of which the following is a specification.

This invention relates to a lamp lens in which the reflection from the internal surface is utilized, the lens being formed with a co-axial hole extending through it in which the source of light is placed, and the object of the present invention is to construct such a lens in such manner that the variation of parallel of the emerging beam is reduced to approximately 1'.

The best result possible with such a lens so far as I have been able to ascertain is a variation from the parallel of the emerging beam of between $3\frac{1}{2}°$ and $4°$.

While very admirable for motor car lamps, something more accurate is essential in the best signaling lamps and search lights; hence I have designed the subject of the present application to meet these requirements.

With the lens constructed as in my present application this error is reduced to 1' which should mean that with a point as the source of light the beam would penetrate two hundred times as far.

Practically however the error due to the size of the illuminant has to be allowed for and hitherto with a 5" lens in the best circumstances a beam is obtained of nine times the candle power from the same source. A larger lens would of course give a higher factor until that size was reached at which the increased absorption of the glass balanced the increase in parallelism.

My invention will be clearly understood by the aid of the annexed drawings of a section of the lens and in which the approximate dimensions of the parts of the proposed lens are shown. The final and accurate figures must be calculated with reference to the index of refraction of the glass employed.

The two curves A,C C,E have a common tangent at C. This tangent at the junction C of the two curves makes an angle of 45° with the ray of light from S (the illuminant) passing through the point C. The curves A,C, C,E form an axial section of the convex surface of the lens and the tangent at the junction C of the two curves is inclined at an angle of 45° with the axial line and when the hole is cylindrical the line joining the center of the illuminant with the junction C is in a transverse plane passing through the center of the illuminant and at right angles to the axis.

Taking the diameter of the lens as 1 the length of the hole A,F will be 3 and its diameter 26. The radius of the curve A,C is 1.03 and of the curve C,E 1.58, B and D being their respective centers. It is obvious that C,B and D are in the same straight line.

The lens may consist of one piece only, or of two or more pieces cemented together, but I prefer it to be in two pieces cut on the line G,G to enable the two curves to be ground or polished on the toric principle which is both more accurate and less expensive than any method of polishing by guides. The correct curve A,C,E is neither part of a circle nor a conic section so far as I can ascertain. The effect of the variation in refraction at the surface A,F throws the parabola, that would otherwise be required completely out.

The line of junction of the two curves of the lens is in a plane parallel to the face of the lens. The source of light is only in this plane if the hole is cylindrical, deviating forward or backward (if the hole is conical) toward its smaller end, but the path of the rays of light enters the plane at the surface of the hole.

What I do claim as my invention and desire to secure by Letters Patent, is:—

1. A lens comprising two sections each having a co-axial hole therethrough and outer convex faces formed with curves of different radii, said curves having a common tangent at the junction of said sections and a source of light positioned in said co-axial holes.

2. A lens comprising two sections, each having a co-axial hole therethrough and outer convex surfaces formed with curves of different radii, said combined sections having front and rear faces and adjoining surfaces perpendicular to the longitudinal axis of said holes, said curves having a common tangent inclined at an angle of 45° to said adjoining surfaces and a source of light positioned in said alining holes.

In testimony whereof I have hereunto set my hand in presence of two subscribing witnesses.

WILLIAM THOMAS COULSON.

Witnesses:
   J. M. BERTHELOT,
   WM. O. BROWN.